(12) United States Patent
Salmon et al.

(10) Patent No.: US 8,068,049 B2
(45) Date of Patent: Nov. 29, 2011

(54) PASSIVE DETECTION APPARATUS

(75) Inventors: Neil A Salmon, Malvern (GB); Stephen D Hayward, Malvern (GB); Tej P Kaushal, Malvern (GB); David A Millington, Malvern (GB)

(73) Assignee: QinetiQ Limited, London (GB)

( * ) Notice: Subject to any disclaimer, the term of this patent is extended or adjusted under 35 U.S.C. 154(b) by 681 days.

(21) Appl. No.: 12/084,548

(22) PCT Filed: Nov. 8, 2006

(86) PCT No.: PCT/GB2006/004168
§ 371 (c)(1),
(2), (4) Date: May 5, 2008

(87) PCT Pub. No.: WO2007/054685
PCT Pub. Date: May 18, 2007

(65) Prior Publication Data
US 2009/0284405 A1    Nov. 19, 2009

(30) Foreign Application Priority Data

Nov. 9, 2005 (GB) .................................. 0522854.9
May 18, 2006 (GB) .................................. 0609826.3

(51) Int. Cl.
*G01S 13/00* (2006.01)
(52) U.S. Cl. ....................................................... 342/22
(58) Field of Classification Search ...................... 342/22
See application file for complete search history.

(56) References Cited

U.S. PATENT DOCUMENTS

| | | | | |
|---|---|---|---|---|
| 3,028,596 | A | * | 4/1962 | McGillen et al. ............. 342/351 |
| 3,911,435 | A | * | 10/1975 | Mardon et al. ................ 342/351 |
| 4,074,114 | A | * | 2/1978 | Dobras ...................... 235/462.07 |
| 4,768,096 | A | * | 8/1988 | Cannella et al. ............... 358/473 |
| 5,073,782 | A | * | 12/1991 | Huguenin et al. ............. 342/179 |
| 5,227,800 | A | * | 7/1993 | Huguenin et al. ............. 342/179 |
| 5,805,110 | A | * | 9/1998 | McEwan ....................... 342/387 |

(Continued)

FOREIGN PATENT DOCUMENTS

EP    1 234 195    8/2002

(Continued)

OTHER PUBLICATIONS

International Search Report for PCT/GB2006/004168 mailed Jul. 12, 2007.

(Continued)

*Primary Examiner* — John Sotomayor
*Assistant Examiner* — Peter Bythrow
(74) *Attorney, Agent, or Firm* — Nixon & Vanderhye, P.C.

(57) ABSTRACT

A passive detection device is disclosed comprising a plurality of antennas, receivers, and a digital beamformer, wherein the antennas and receivers are adapted to receive radiation of millimeter wavelengths from a near field region, to process and digitize it. The beamformer is adapted to process the received information and to generate static image information relating to the region. An indication means is provided to indicate the presence of objects of interest. The beamformer is preferentially adapted to generate information simultaneously in a plurality of planes at different distances from the apparatus. The indication means may comprise an array of pixels along the length of the apparatus to display image information, and may use the multi-planar information to construct images of the region comprising data from a plurality of planes. The invention has utility in security scanning applications such as at airports or other locations where security detection equipment is employed.

20 Claims, 9 Drawing Sheets

U.S. PATENT DOCUMENTS

Figure 2B:
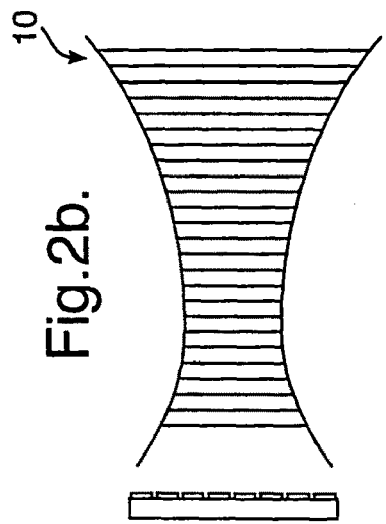

| | | | |
|---|---|---|---|
| 5,969,661 A * | 10/1999 | Benjamin | 342/22 |
| 6,466,155 B2 * | 10/2002 | Taylor et al. | 342/22 |
| 6,480,141 B1 * | 11/2002 | Toth et al. | 342/22 |
| 6,828,556 B2 * | 12/2004 | Pobanz et al. | 250/336.1 |
| 6,937,182 B2 * | 8/2005 | Lovberg et al. | 342/22 |
| 6,950,054 B1 * | 9/2005 | Steinway et al. | 342/22 |
| 6,965,340 B1 * | 11/2005 | Baharav et al. | 342/22 |
| 7,015,969 B2 * | 3/2006 | Brown et al. | 348/373 |
| 7,194,236 B2 * | 3/2007 | Lovberg et al. | 455/25 |
| 7,358,890 B2 * | 4/2008 | Price et al. | 342/82 |
| 7,777,570 B2 * | 8/2010 | Lai | 330/276 |
| 2002/0067520 A1 * | 6/2002 | Brown et al. | 358/906 |
| 2003/0163042 A1 * | 8/2003 | Salmon | 600/436 |
| 2003/0178034 A1 * | 9/2003 | Yuki | 128/922 |
| 2004/0056790 A1 * | 3/2004 | Lovberg et al. | 342/22 |
| 2004/0080448 A1 * | 4/2004 | Lovberg et al. | 342/22 |
| 2005/0093733 A1 * | 5/2005 | Lovberg et al. | 342/22 |
| 2006/0232828 A1 * | 10/2006 | Salmon | 358/448 |
| 2007/0188370 A1 * | 8/2007 | Coward et al. | 342/22 |

FOREIGN PATENT DOCUMENTS

| | | |
|---|---|---|
| EP | 1 338 902 | 8/2003 |
| GB | 2 034 554 | 6/1980 |
| GB | 2 357 209 | 6/2001 |
| GB | 2 387 734 | 10/2003 |
| GB | 2 416 850 | 2/2006 |
| WO | 01/33258 | 5/2001 |
| WO | 2005/017559 | 2/2005 |
| WO | 2005/062943 | 7/2005 |
| WO | 2005/069036 | 7/2005 |

OTHER PUBLICATIONS

Written Opinion for PCT/GB2006/004168 mailed Jul. 12, 2007.
Search Report for GB0522854.9 dated Feb. 23, 2006.
Search Report for GB0609826.3 dated Nov. 10, 2006.

* cited by examiner

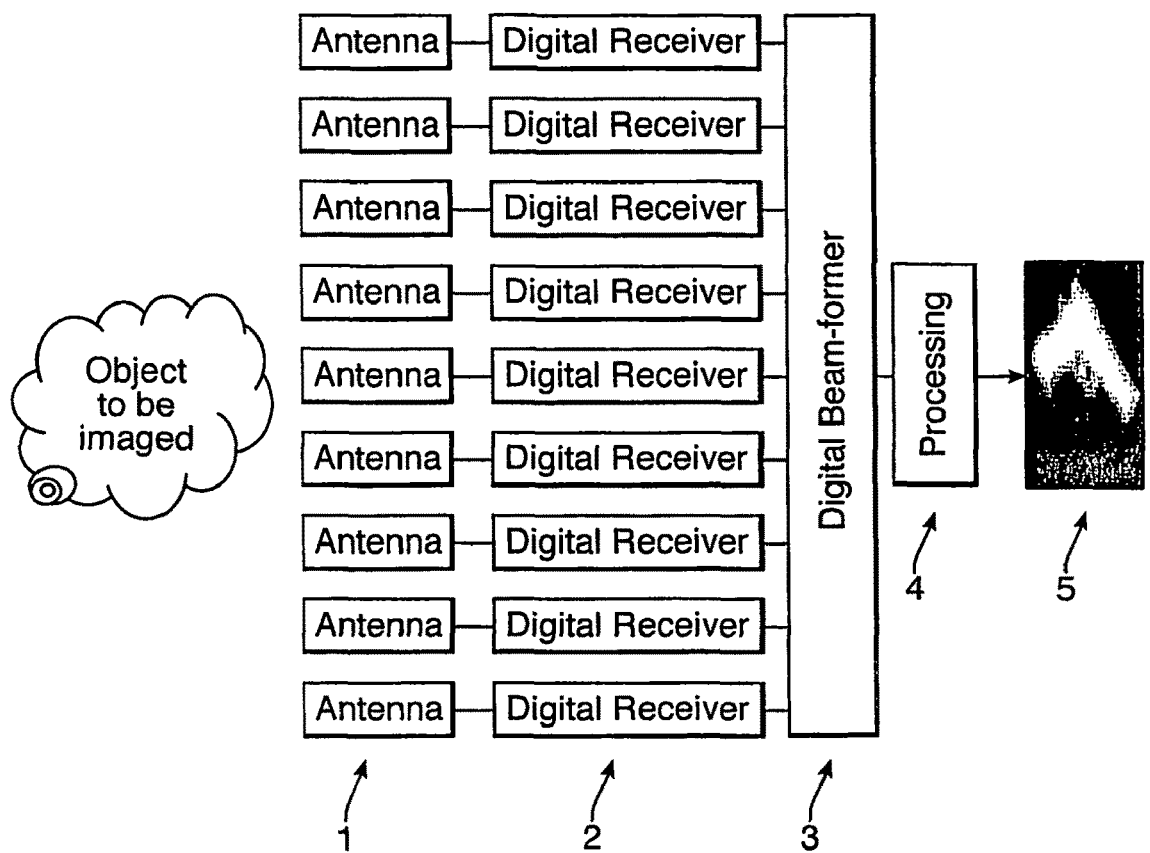

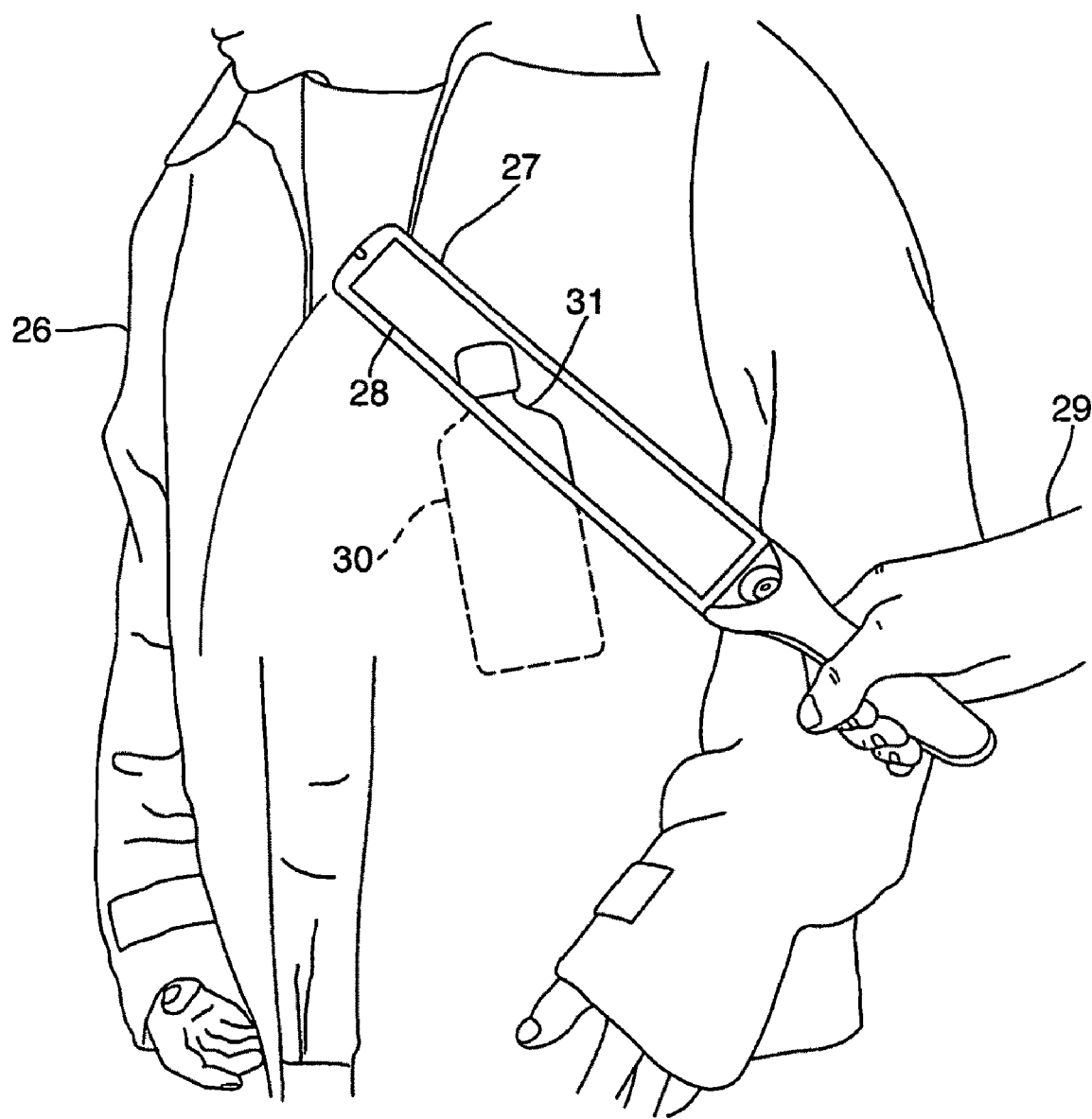

PASSIVE DETECTION APPARATUS

This application is the U.S. national phase of International Application No. PCT/GB2006/004168 filed 8 Nov. 2006 which designated the U.S. and claims priority to Great Britain Patent Application Nos. 0522854.9 filed 9 Nov. 2005 and 0609826.3 filed 18 May 2006, the entire contents of each of which are hereby incorporated by reference.

The present invention relates to passive imaging and detection systems, and in particular to such systems that may be used to detect or locate objects which are visibly obscured for example, under a persons clothing, inside a package or baggage, under a floor or inside or behind a wall.

Frequent need to search people and objects to check for certain items such as contraband, knives or other weapons, or for stolen goods etc. has provided a need for fast and effective searching procedures to be employed Current procedures include frisking each person, or opening each package entering security controlled areas of ports, terminals, arenas, or for carrying out spot checks. This is consuming, irritating to the people being searched, and labour intensive. Also it may not find small or well hidden items. Various technologies are currently used, but each has shortcomings, in terms of efficiency, perceived safety or cost.

Metal detectors in the form of archway systems, in particular at airports, are useful in identifying individuals having quantities of metals on them, but they do not provide any indication as to what the metallic items are or their precise location, and so can still lead to a significant amount of frisking of the person by security personnel.

X-ray machines are in common usage for the examination of packages, and can provide a view inside a package, but are not suitable for searching people or animals due to actual or perceived health risks associated with the use of ionising radiations. Furthermore, for the detection of small amounts of low atomic number metals and for the discrimination of some organic and inorganic materials X-ray sensors are ineffective.

Infra-red systems currently being pursued for security scanning of personnel are also failing due to the poor transmission of clothing in this band.

Millimeter wave systems providing imaging capabilities through clothing have recently gain acceptance due to their capability to detect and locate both metallic and non-metallic objects concealed under a person's clothing. See for example Passive Millimeter Wave Imaging Technology IX", Volume 6211, Proc. SPIE, Defense and Security Meeting, Orlando, April, (2006). This capability exists from the centimeter band (few GHz) to the sub-millimeter wave band covering the low terahertz region (herein generally referred to as the millimeter wave band) and encompasses both active and passive systems. The capability trade-offs over this band are at low frequencies penetration of obscurant is high but diffraction limited image resolution is poor, and vice-versa at higher end of the band. The discrimination capabilities in this band for non-metallic materials is also good. For example due to the presence of water with its large dipole moment in many organic solids, including the human body and liquids their signatures are quite different from the many covalently bonded inorganic solids and liquids, which in many cases may be associated with security threats.

However, millimeter wave imaging systems are bulky and expensive, often having large moving parts and this is a critical issue for market acceptance of this technology. In addition, for the detection of some materials radiometric sensitivities significantly less than 1 K are required which is currently challenging for existing PMMW imaging systems. Current imaging systems have system sensitivities typically at the level of a few Kelvin, and so cannot satisfy this important market requirement. Furthermore, as current PMMW imaging technology operates in the near-field, depths of fields are small, typically a few centimeters, meaning security scanned personnel are required to remain within a certain fixed volume of space whilst being imaged, which is a severe operational limitation.

It is an objective of the current invention to overcome or at least ameliorate the shortcomings of the above mentioned prior art, whilst providing a convenient means of object location for many different purposes.

According to the present invention there is provided a passive detection apparatus comprising a plurality of antenna elements arranged in an array, each antenna being receptive to radiation in the millimeter or sub-millimeter wavebands and connected to a receiver system, and further comprising a digital beamformer, a processor and an indication means, the receivers being adapted to receive and digitise radiometric emissions from a target, and the beamformer being adapted to receive digital information from the receiver system and to pass information to the processor, characterised in that the beamformer is further adapted to process the received information to focus upon a near field region of the antenna array, the processor being interconnected to the beamformer and adapted to periodically generate static image information in at least a primary axis of the apparatus in real time or near-real time, and wherein the indication means is adapted to provide an indication based upon the generated static image information.

The processed image information may comprise a one-dimensional (1D) image comprising a line of pixels, two-dimensional (2D) image comprising a two dimensional array of pixels or voxels, or three dimension (3D) imaging comprising of a three dimensional voxel image.

Such image information, be it 1D 2D, or 3D is known herein as static image information, as it is image information that is obtained in a relatively short time span where there is little or no relative movement between the apparatus and the subject.

The current invention provides an apparatus that is as convenient to operate either as a hand-held portable device or as a fixed installation detector, providing a means to image static or moving objects, or to reveal concealed metal and non-metallic objects. For personnel security scanning it provides a non-invasive means to frisk, as no physical contact is made between the detector and the person and for packages it provides a means to recognise the contents without opening or even touching the package. For example, an unattended bag may be scanned from one side.

The apparatus may have indication means integral thereto comprising a display means adapted to display an image formed within the apparatus. The antenna elements are preferably arranged in an array on the surface of the apparatus. The array may be one or two dimensional. The static image information produced by the apparatus may be recorded and, in the case of a portable apparatus, sequential static images recorded from differing physical positions or orientations of the apparatus from its physical movement and alternative orientation may be combined, so providing an improved image due to the additional information gathered. Relative movement between the apparatus and the subject can provide better image sampling. In the case of a one-dimensional static image this relative movement may be exploited to reveal another dimension of the image of a part or the whole of the item or person being scanned. In the case of a fixed installation, such as when the apparatus is mounted in a portal, this additional dimension or better sampling can be provided by the physical movement of the subject, for example linear or circular movement of the person or package past the sensor. Such an image that is made up from two or more static images, is known herein as a complex image, and the information used to create a complex image is known as complex image information. The complex image may be a 2D or a 3D image.

The indication means may comprise, as well as or instead of a display, a sound generator, a light generator, a vibrational unit, or any other suitable indicator. Such indicators may be arranged to be activated should an object of interest be detected. The indicator means may also be adapted to provide a display which is enhanced by the addition of false colours, outlines or other such processing methods to enable detected objects to be identified more easily.

The apparatus may incorporate means for detecting one or more of the degree(s) of movement or the direction of movement of one or more parts of the apparatus, to aid the process of combining the successive periodically obtained static images into a complex image.

Alternatively or as well, the apparatus may use a correlation process on different static images and use the results thereof to produce a complex image. Such a process may make use of the rate of change of the information in the various channels to estimate the apparatus movement and so generate complex image information that is relatively undistorted by the movement.

The integral display may be adapted to show only a part of the image, depending on the location and/or orientation of the apparatus. The part of the image to be displayed preferably is arranged to coincide with the location and orientation of the apparatus. Thus the image displayed will then appear to be a view of a narrow "slice" of the complex image that may change as the apparatus is moved around. In this manner a view of what is below the apparatus (i.e. the region being imaged by the apparatus) at a given instant will appear on the display, providing an evanescent complex image to a viewer as the apparatus is moved. The image may comprise a single row of pixels arranged along the primary axis of the apparatus displaying, at a given instant, a single static image. Alternatively, the image may comprise two or more rows of pixels. There may be a gap between each row.

The apparatus provides information that may be converted into an image by appropriate processing the signals received by the array of receive antennas. Due to the typical dimensions of the apparatus, and the proximity of it to the object or person being scrutinised, the apparatus may be imaging in the near field of the antenna system. For the purposes of this specification an item is in the near field if it is closer to the apparatus than approximately the square of the longest aperture linear dimension, divided by the wavelength of operation.

The processing on the received signal may, if it is operational in the near field, comprise a modified form of correlation imaging, the modification being to allow the apparatus to focus radiation emanating from within a near field region of the antenna array of the apparatus.

The apparatus may also incorporate an integrated metal detector function. The metal detector preferably comprises a plurality of sensor adapted to associated any detected metallic object with a localised region of the apparatus.

Figure 4:
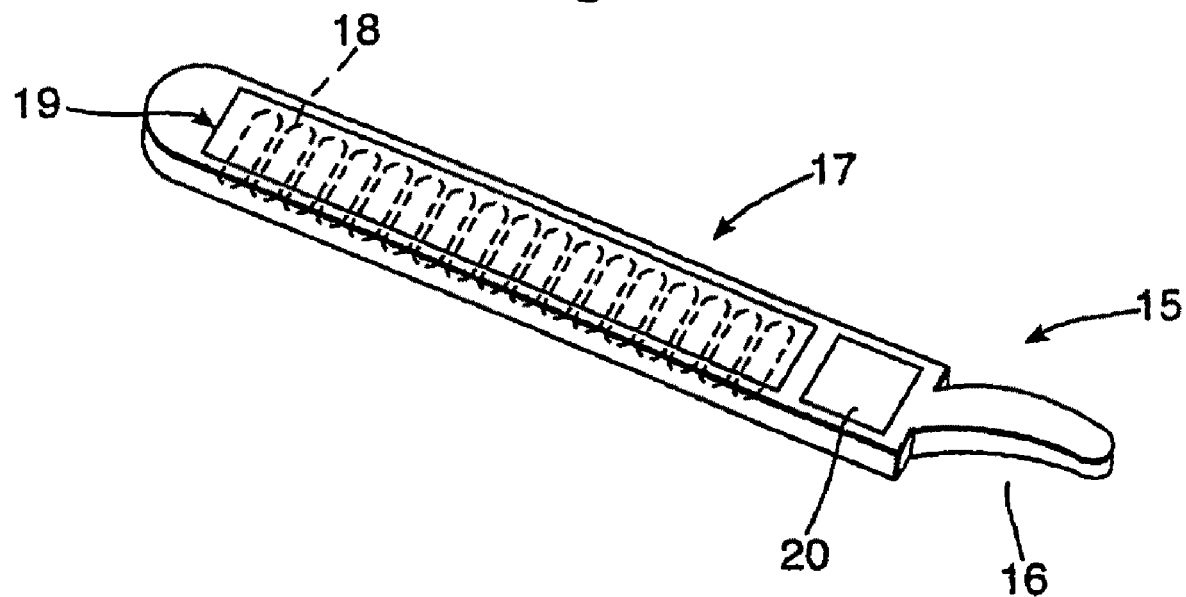
Figure 5C:
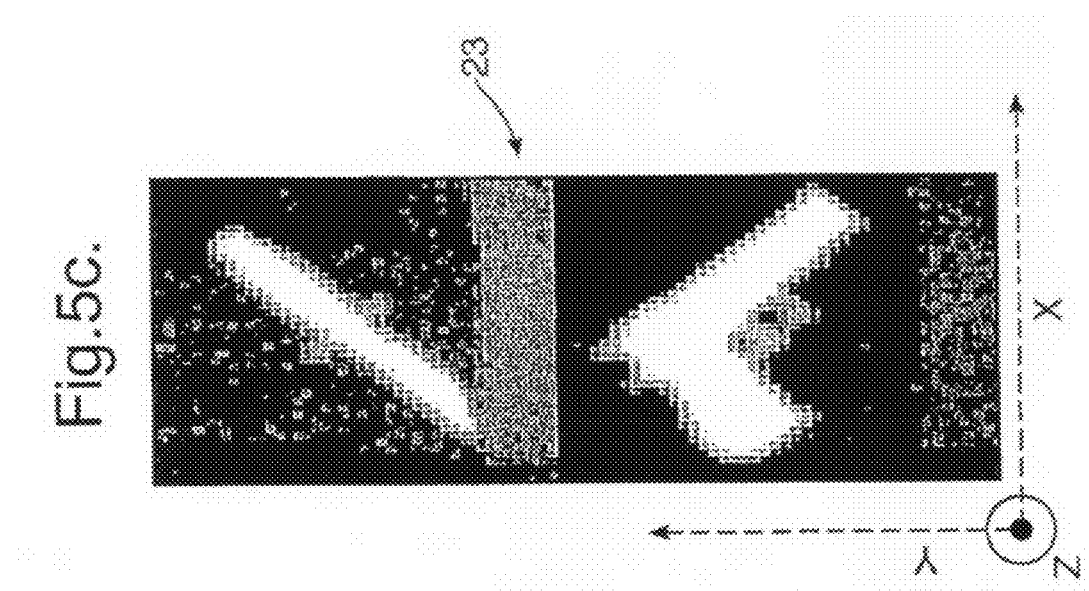
Figure 5B:
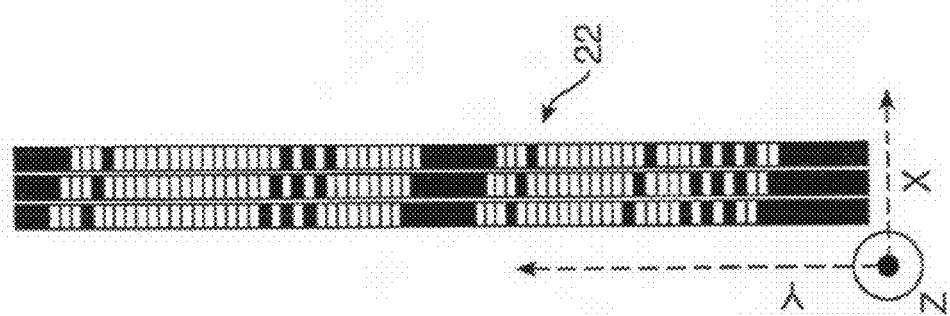
Figure 5A:
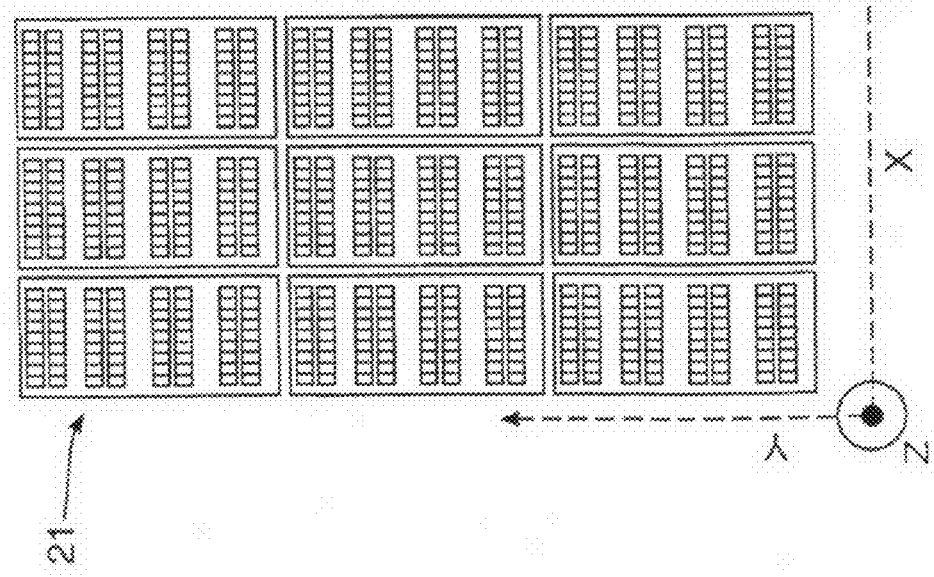

The invention will now be described in more detail by way of example only, with reference to the following Figures, of which:

FIG. 1 shows a top level block diagram of key parts of an embodiment of the invention;

FIG. 2 diagrammatically illustrates a first embodiment of the present invention having a 1D array, along with representations of a near-field beam pattern;

FIG. 3 diagrammatically illustrates static and complex image information that may be produced using the first embodiment;

FIG. 4 diagrammatically illustrates a second embodiment of the present invention, wherein the device is arranged to be handheld;

FIG. 5 diagrammatically illustrates a third embodiment of the present invention that employs a 2D antenna array, and shows simulated example static and complex images that may be produced therefrom.

Figure 6:
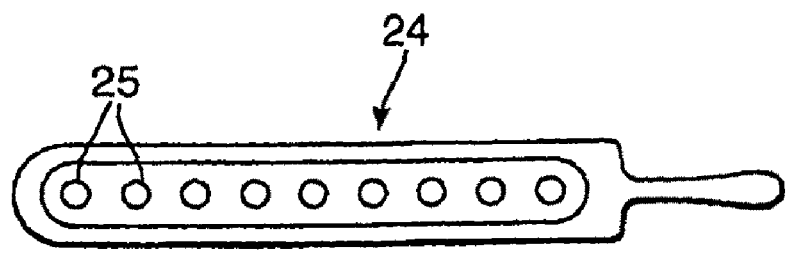
Figure 8:
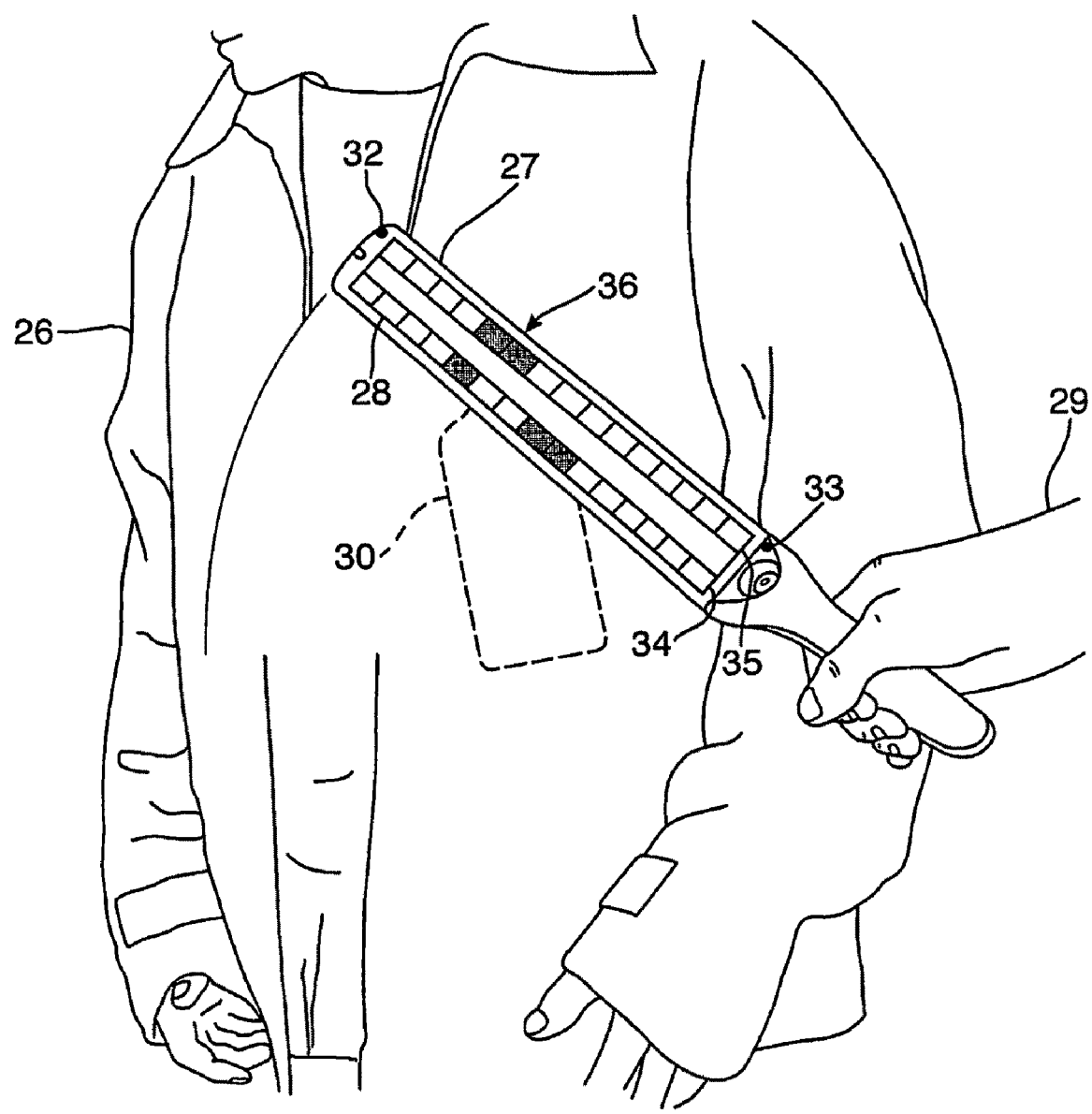
Figure 9:
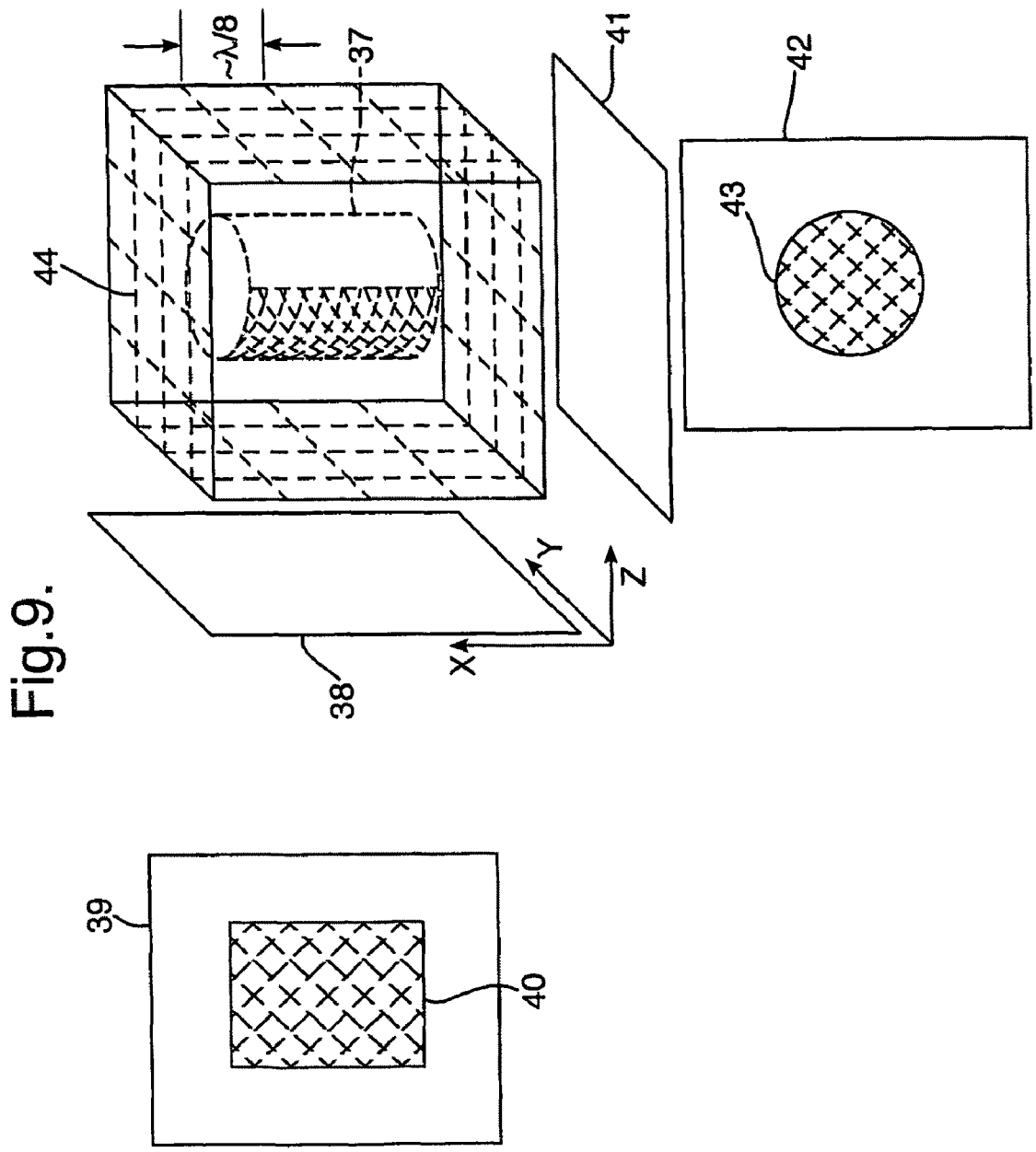
Figure 10:
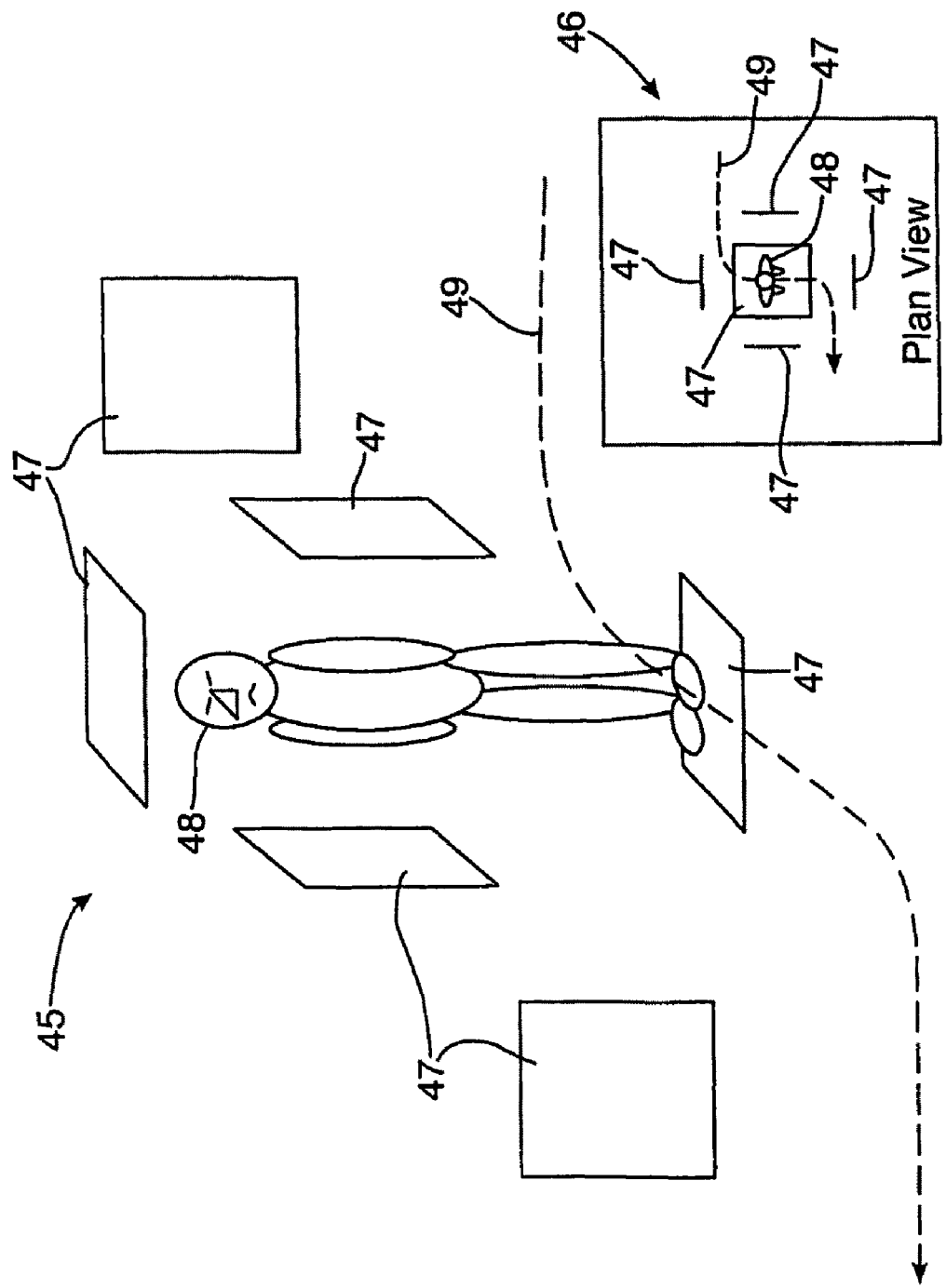

FIG. 6 diagrammatically illustrates a fourth embodiment of the present invention, having sensors working at infra-red wavelengths;

FIG. 7 diagrammatically illustrates an embodiment of the invention incorporating a large, high aspect ratio screen, showing the apparatus being used to detect an object on a person;

FIG. 8 diagrammatically illustrates an embodiment of the invention having a display comprising two rows of pixels;

FIG. 9 diagrammatically illustrates a representation of how 3D voxel representations may be collapsed to give a 2D image where all pixels in the 2D image are in focus; and FIG. 10 diagrammatically illustrates the present invention being used in a portal.

FIG. 1 shows a schematic of the key components of the apparatus. A plurality of antenna elements 1 together define a pupil plane antenna of the apparatus. Each antenna 1 is linked to a digital receiver 2. The number of antennas 1 and digital receivers 2 may vary according to the requirements of a particular embodiment. The outputs of the digital receivers 2 are connected to a digital beamformer 3, which is in turn linked to a processor 4 then to a display 5, or other suitable indication means. Note that the terminology "pupil plane" array refers to that plane of an imager at its aperture, as opposed to that at its focal plane, the latter being at the focus of the imager. Information in the two planes is related mathematically through the Fourier transform. Some types of receivers in the radio spectrum such as phased array radars and radio astronomy interferometric systems use pupil plane receivers, whilst almost all optical imaging systems use focal plane array receivers, for example the human eye.

The receiver sections 2 in FIG. 1 may comprise of amplification and filtering stages, and a short word digitiser. No detection or signal squaring is present at this stage, as phase information needs to be available for the beamformer 3. The architecture shown in FIG. 1 does not implicitly include a heterodyne architecture, but for convenience of using lower frequency components a heterodyne mixing manifold may additionally be included. This would use a single local oscillator distributed to heterodyne mixers in each of the channels of the system. Phase terms in the distribution of the local oscillator would be included in system calibration stages as discussed below. Likewise, bandpass sampling may be exploited in the digitisation, followed by digital down conversion to create digital samples of in-phase and quadrature signals.

The Digitiser present in each digital receiver 2 of FIG. 1 need only be short word—single bit may suffice for creating a good image, two bits being required to retain information about absolute level of radiometric intensity, reaching diminishing returns on image quality for four bit words. It has been recognised that sampling using short words is only sensible in radiometry as the signal to noise ratio prior to detection is unity, this being a general property of thermal emission.

The radiometric temperature sensitivity (see reference LeVine, given elsewhere in this specification) for an apparatus according to the invention is given by Eq 1. where $T_A$ and $T_N$ are scene radiation temperature and receiver noise temperature, $B_{RF}$ is the radio frequency bandwidth, $t_{INT}$ is the integration time of the measurement and F is the fraction of the full aperture of the system which is covered with receiving antennas.

$$\Delta T = \frac{T_A + T_N}{\sqrt{B_{RF} t_{INT}}} \frac{1}{F} \quad \text{Eq. 1}$$

PMMW imaging systems capable of satisfying market expectations on performance necessarily require radiometric sensitivities of a few Kelvin or less for real-time operation ($t_{INT}$~40 ms). As such, minimum bandwidths, $B_{RF}$, are of the order of a few hundred MHz, whilst ideal bandwidths may rise to 20 GHz. Nyquist constraints on signal aliasing therefore require sample frequencies of twice this, putting a great demand on the technology of ADCs, but guaranteeing that all requisite phase and amplitude information is recorded. Such high speed sampling may be achieved in a novel and economical fashion in the embodiment described herein by use of a serial input found on many Field Programmable Gate Array (FPGA) devices. These devices may be exploited by using the comparator on the serial inputs as a single bit ADC, which currently has the capability to sample up to 10 Gsps. A pair of these inputs coupled through a potential divider could be exploited to construct a high-speed two bit ADC.

The receivers and antennas in FIG. 1 may be adapted to independently process signals having different polarisations. This allows information to be gathered relating to, for example, horizontal and vertical polarisation, or left and right handed circular polarisations. Dual or multi-polarisation antennas are well known. The use of multiple polarisation sensors provides additional flexibility and offers a powerful discriminating capability, allowing greater potential to conduct material classifications and identifications. This is possible as emission from different materials and viewed from different directions have varying and known polarimetric signatures.

Figure 2C:
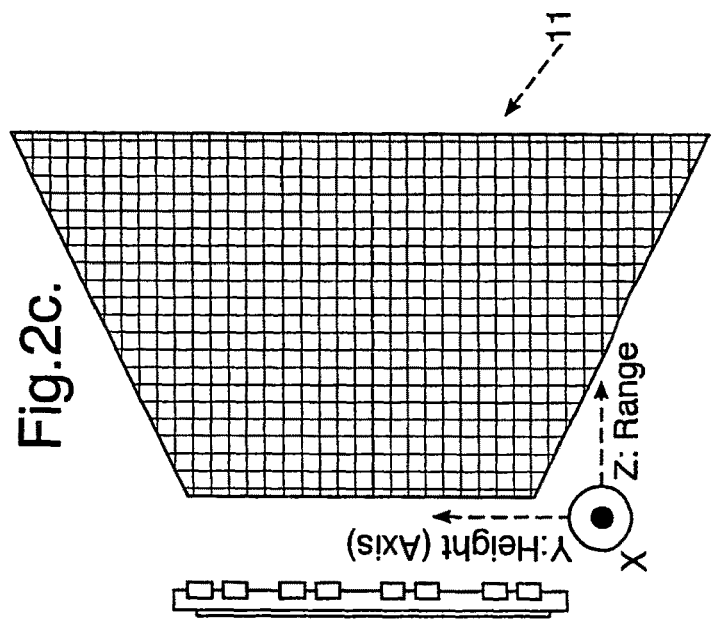
Figure 2A:
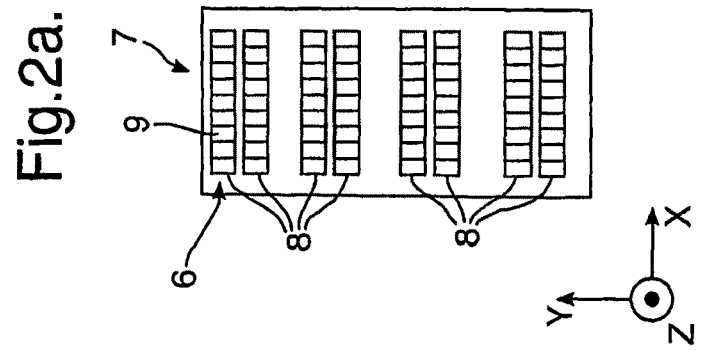

FIG. 2 shows a first embodiment of the invention. A one dimensional (1D) array 8 of antenna elements 6, shown face-on in FIG. 2a mounted on the front of a tile 7. The tile 7 contains a receiver array 2, and a one dimensional beamformer 3 and then linked to a processor 4 and a display 5 (as shown in FIG. 1). The 1D array 8 of antenna elements 6 is in the axis of the apparatus and each antenna element 6 of the 1D array can be made up of separate sub-antenna elements e.g. 9 which are phased in a fixed manner in relation to each other to focus the beam 10 in a direction orthogonal to the axis and range, improving the spatial resolution of the apparatus, as illustrated in FIG. 2b. Each of the elemental antennas 6 therefore has a fan shaped beam 12 as shown in FIG. 3b, overlapping with other antenna patterns of the other elements 6, a necessary requisite for the 1D digital beam-former 3 to beam-form in the dimension along the axis.

FIG. 2c shows diagrammatically how the fan beams produced by antennas 6 may be processed to provide range information, indicated as a set of voxels 11

Figure 3A:
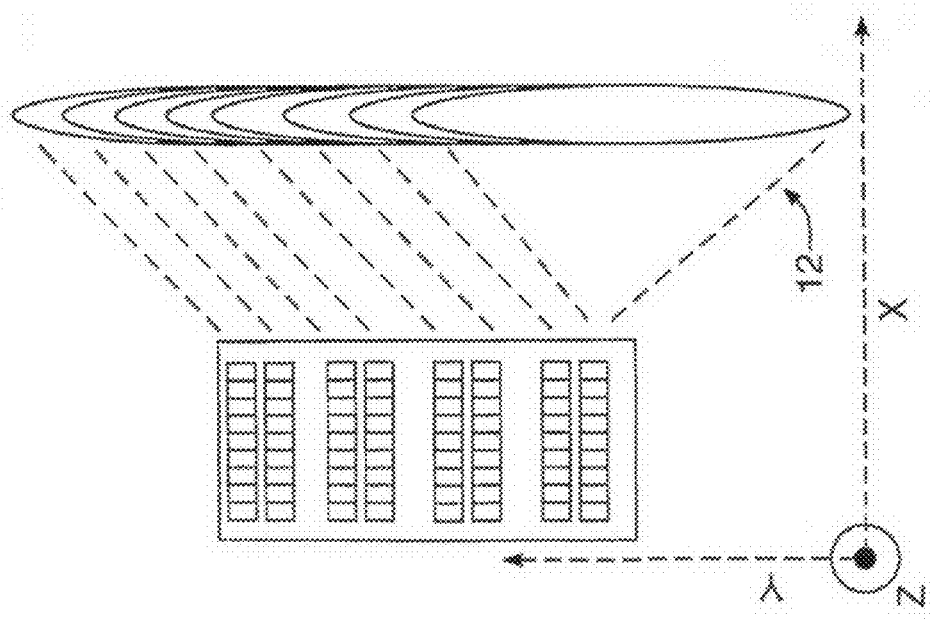
Figure 3B:
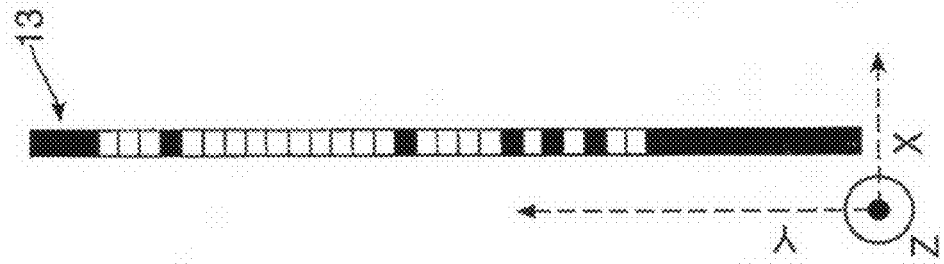
Figure 3C:
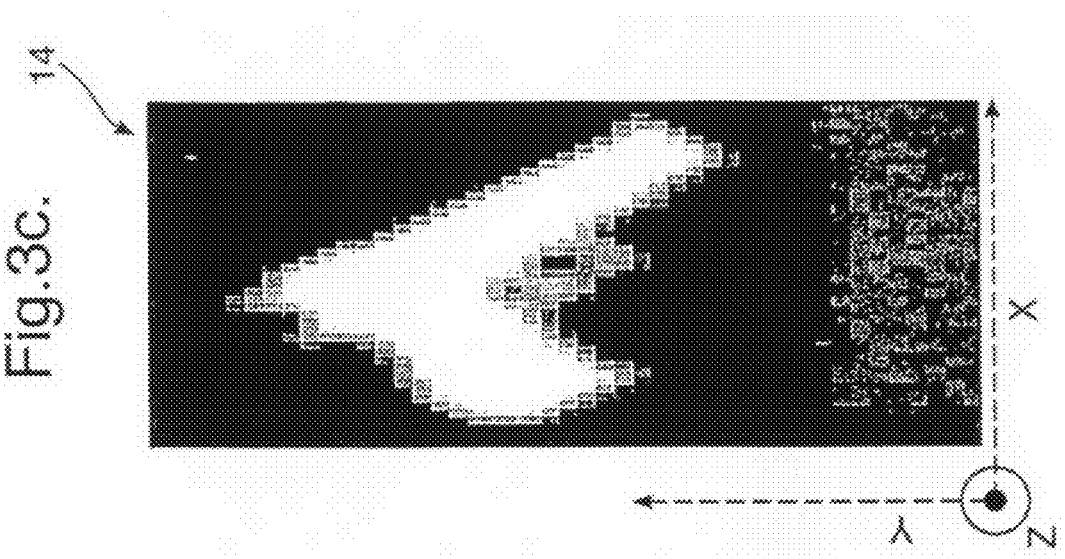

FIG. 3 illustrates how the overlapping fan shaped beams 12 of the first embodiment, as shown in FIG. 3a are digitally beam-formed into a 1D static image 13 of the concealed object, shown in FIG. 3b. By taking multiple 1D static images 13 as shown, as the apparatus is moved relative to a target scene, a 2D image 14 is built up as shown in FIG. 3c.

Applications for an apparatus according to the invention are likely to be in the near-field and as such it becomes possible through phase shifts to focus the imager at a number of different near field ranges, as illustrated in FIG. 2c. The near-field information recorded to produce a static image necessarily comprises of 2D voxel elements, having dimensions along the axis of the apparatus and in range. This can be collapsed by processing to present a 1D image. Alternatively, the 2D voxel information can be stored and processed together with the other 2D voxels acquired. Subsequent processing is therefore done to produce a 3D voxel image of the subject. The 3D voxel image may be analysed to determine the spatial locations of the concealed object in the scan or through processing may be collapsed in the range axis to present the best 2D image to an operator, where all objects regardless of near-field range are in focus.

The first embodiment incorporates a processor and display integral to the apparatus, but they may also be remote, being linked by a suitable interface. The display could be either 1D or 2D, dependent upon on precise use of the apparatus.

FIG. 4 shows a second embodiment of the invention. This is similar in principle to the first embodiment described above, in that it uses a 1D array of antenna elements, but is adapted to be a portable device able to be used as a wand to frisk persons and items. A wand 15 comprises a handle 16 and an active region 17. The active region 17 incorporates a linear array of antennas 18 on the underside, (shown as dotted lines), and houses electronics (as described in relation to FIG. 1) for processing signals from the antennas 18 and converting them into image information. The array of antennas 18 are similar to the array 8 as shown in FIG. 2 above. The image information is presented on display 19, and also on display 20. Display 19 is a high aspect ratio display screen, and is arranged to display information relating to whatever is beneath the active region 17 at a given instant, whereas display 20 is adapted to show a more complete image corresponding to an area over which the wand 15 has recently been swept.

The processing used in the second embodiment is similar to that described in relation to the first embodiment above, except that the receiver incorporates a downconverter to reduce the signal frequencies supplied to the digitiser, so easing the required capabilities of the digitiser, and reducing its cost.

The antenna array 18 preferably comprises an array of patch, short horn or slot antenna elements, although any suitably sized antenna element operable at the wavelengths of interest will be acceptable. The antenna elements are arranged axially along the apparatus to facilitate use of the apparatus in a wand-like manner. Each antenna element has a radiation beam pattern that is wide in the axial direction and narrow in a transverse direction. Such an arrangement allows beamforming techniques in its beamformer to be used to generate narrow beams in both axes and so produce a satisfactory resolution in any final image. The radiation pattern of each antenna 18 in the transverse axis may approximate to a Gaussian pattern. For one dimensional electronic beam-forming, beam-forming in the transverse direction is provided by a one dimensional axial array of antennas with gain higher in the transverse direction than the axis. In order for the electronic beam-forming to function the beam-patterns of the antennas must overlap, as illustrated in FIG. 3a above. For two dimensional electronic beam-forming, one or more adjacent axial arrays are used where the gains of the antennas overlap to enable electronic beam-forming.

The embodiment shown in FIG. 4 has sixteen channels, each channel having an individual antenna element 1 and receiver/downconverter 2 (as shown in FIG. 1). However, it may be advantageous to have more channels to provide an improved resolution, albeit at the expense of additional hardware and increased processing demand, or fewer channels if the performance requirements are reduced.

Each receiver channel 2 may be any suitable receiver operable in the frequency range, and bandwidth of interest. Typically, the RF bandwidth of such an embodiment of the present invention may be between approximately 1 GHz and 20 GHz, such as 2 GHz, such as 5 GHz, such as 10 GHz, although other embodiments may have bandwidths outside of this range. The typical RF frequency of operation of the receivers 2 will be in the region of 30-100 GHz, although this will tend to expand upwards as improvements in technology bring down the costs of manufacture at higher frequencies, bringing with it an increased system spatial resolution. This embodiment of the invention has utility at frequencies of up to a Terahertz or even beyond, dependent upon the availability of amplifiers, receivers, downconverters etc. operable at these frequencies.

Each receiver 2 downconverts the received signal to an intermediate frequency (IF) where it may be more conveniently processed. A local oscillator (LO) signal may be provided to each receiver channel for this purpose. The LO is preferably phase coherent across all receiver channels.

Each receiver channel 2 output is converted from an analogue signal to a digital signal using a digitisation system (not shown). The digitisation system preferably uses a single bit analogue to digital converter for each receiver channel. This has the advantage of minimising the data rates at the output of the digitisation system whilst still maintaining a suitable signal to noise ratio. Conveniently, a serial input typically found on a field programmable gate array device may be used as a single bit digitiser operable at very high speed. Alternatively, application specific integrated circuits (ASICs) may be used in a system to offer a more compact system and/or lower power consumption.

Both of the above described embodiments utilise a Correlation Imaging beamforming technique described below to create static image information comprising of between ~n, and approximately $n^2$ pixels, dependent on the density of the pupil plane antennas, where n is the number of antenna elements. Transverse movement of the apparatus 13 is used to generate static image information from different parts of the object being scrutinised, and a complex image built up by combining multiple static image data as described above.

FIG. 5 shows a third embodiment of the invention incorporating a 2D pupil plane antenna array 21. The antenna array 21 comprises elemental antennas each similar to those in previous embodiments except that the 2D array is formed by having a plurality of antennas in the X axis as shown. Each antenna in the array 21 is linked to a digital receiver as in the previous embodiments, with the receivers feeding a 2D digital beam-former. Extending the dimension of the antenna array and digital beam-former from 1D to 2D means the static image information 22 measured in the axes of the pupil plane is likewise increased in dimension from 1D to 2D. The beam-patterns of the antennas can be arranged to be such that the static image size is greater in the Y axis than perpendicular to the axis. This means the resultant 2D image 22 is elongated, as illustrated in FIG. 5b. The image size can be increased by relative motion in the X or Y direction, as is the case for the first and second embodiments. The natural movement of people on a walkway, escalator or objects on a conveyor belt may be exploited to this effect to produce larger, more detailed images 23 as shown simulated in FIG. 5c.

In this third embodiment a flat area such as a wall, door or a security scanning portal area may be tiled in two dimensions with these pupil plane antenna arrays, providing a PMMW imaging capability, with a footprint significantly reduced in size in comparison to existing PMMW sensors. These basic building blocks may be referred to by the name of wafer tiles, due to the relatively thin nature of the antennas as compared to traditional passive mm wave optical systems. As this sensor functions in the near field, it would not be a requirement for each of the signals from the pupil plane antennas to be combined with all other signals. Local groups would be combined, which when having data in digital format is less difficult than in an analogue process.

The current invention, and its use of pupil plane arrays, allows the apparatus, including the receivers behind and the processing hardware to be made very much smaller than the equivalent volume required for quasi-optical imaging in existing PMMW imaging system. Alone the antennas, which may be patch, slot or short waveguide horn, and the receivers, can be made of the order of a wavelength thick, meaning systems are deployable in many more scenarios than is possible with current bulky system. This gives the potential to offer volume reductions of close to two orders of magnitude as compared to prior art optical PMMW imaging systems. Furthermore, the capability of electronic scanning systems to offer the very large depth of field in the near-field, as discussed below, removes a severe operational limit from that of current PMMW imaging systems. In addition, the density of the antennas in the pupil can be tuned so that the system radiometric sensitivity can meet the requirement for the detection of some hard to detect materials. This means the pupil plane receiving system can be made significantly more sensitive than existing mechanically scanning systems.

The beamforming process in the above embodiments may be a modified form of Correlation Imaging commonly used in radio astronomy fields, as shown in Thompson, cited earlier, and more recently in the fields of earth observation, for which see LeVine, D. M. and Swift, "*Synthetic Aperture Radiometers for Microwave Remote Sensing from Space*", 0-7803-3068-4/96$5.00©1996IEEE. Correlation imaging in astronomy clearly uses data taken from the far field, and is generally done using extremely sparse receiver arrays comprising earthstations positioned often thousands of miles apart using the rotation of the earth to populate information over all spatial frequencies of the visibility function (defined below). Single images of astronomical objects are generally accumulated over a period of days or weeks. Direct application of the radio astronomy technique to an apparatus of the present invention yields neither an image in focus for the near field nor an apparatus with sufficient sensitivity. A further distinction between the radio astronomers' regime and that of this invention is that the former is normally concerned with frequencies at a few GHz and for narrow bandwidths and as such the use of analogue technology is still predominant, whereas for this invention there is a priority for higher frequencies and bandwidths upwards of 100 MHz and can as discussed below only function with a digital processor. A radical modification of both the apparatus and the processing of signals is thus required to enable the imager described in this invention to generate real or near to real time images in the near field.

In the classical radio astronomy approach (See for example Thompson, A. R., Moran, J. M and Swenson, G. W. "*Interferometry and Synthesis in Radio Astronomy*", 2$^{nd}$ Edition, Wiley, (2001)), as detailed the visibility function is defined as the accumulation (a summation over an integration time) of the complex amplitude of the products of the electric fields measured by pairs of receivers in a two dimensional spatial frequency space. Spatial frequency is the separation of the receiver pair (a vector quantity) divided by the radiation free space wavelength. In the language of radio astronomers this multiplication of the electric fields is referred to as correlation, as a relative delay in one of the signals can be introduced as seen in Eq 5. The resultant visibility function is thus a two dimensional matrix, which contains the spatial frequency information of the far field image. When the visibility function is Fourier transformed it yields the far field image. Mathematically this is stated as in Eq. 2, where l and m are the direction cosines of the viewing direction and u and v are the corresponding spatial frequency co-ordinates. Applied to the existing invention, this method of processing would fail as creation of a single visibility function destroys phase information from the near field images, so there would be no focussing ability in the near field.

$$T(l,m) = FT[V(u,v)] \quad \text{Eq. 2}$$

Therefore the correlation imaging algorithm has been modified to enable it to function in the near field. Near field imaging is one of the aspects which sets this invention apart from the prior art. The near field of an antenna is defined as that region where the phase difference between a point at the object and a point at the antenna aperture changes more by than a predetermined fraction of a wavelength across the aperture. For an eighth of a wavelength this puts the maximum range of the near-field, $R_{NF}$ is as that given by Eq. 3, where D is size of the pupil plane aperture and $\lambda$ is the free space wavelength of the radiation. For example, the maximum near-field range of a 1 meter aperture imager operating at 94 GHz is ~300 m.

$$R_{NF} \approx \frac{D^2}{\lambda} \quad \text{(Eq. 3)}$$

Clearly, radio astronomy interferometric beam-forming imaging systems do not operate in the near-field. Operation in the near-field of the antenna presents particular challenges to optics design engineers, due to the complex phase relations between object and image space and as a result the object and image space are no longer simply related through the Fourier transform. This phase relation has the effect of reducing the field-of-view of any imaging system. For the eighth of a wavelength precision in phase, the depth of field, $\Delta R_{DOF}$, is given by Eq. 4, for a range of R from the antenna, making the depth of field only a few centimeters for PMMW imagers at close range.

$$\Delta R_{DOF} \approx 2\lambda \left(\frac{R}{D}\right)^2 \quad \text{(Eq. 4)}$$

The effect of this is that either multiple focal planes need to be used, which is extremely costly, or a single focal plane array needs to be moved to a given location to image at a particular range, thus losing potentially useful data from other ranges. However, the present invention exploits the complex phase relations in the near field for the purpose of generating 3D voxel images, with no loss of data from near field ranges as explained below.

Creation of the summation correlation matrix is accomplished by the creation of $n(n+1)/2$ correlations from the n receivers.

The summation correlation matrix is necessarily a complex quantity to retain phase and amplitude information and is stated mathematically in Eq. 5, where v are the voltages corresponding to the radiometric fields in channels i, and j, where a relative delay $\tau$ can be introduced between the pair of signals, and the summation is over an integration time $t_{INT}$, which would be 40 ms for a 25 frames per second system.

$$K_{i,j}(\tau) = \sum_{Time t_{INT}} v_i(t) v_j(t-\tau) \quad \text{Eq. 5}$$

This time delay is to correct for wave front angle, so that correlation between signals is guaranteed. However, a time delay is not necessary to create a wide field of view image; it only shifts the angular position of the centre of the image with respect to the axis perpendicular to the pupil plane array. It this time delay is to be synthesised electronically, after a heterodyne process, in the receiver then it needs to be done using digital phase correction, as discussed below, if simultaneous field of view and wide bandwidth imaging (cf Eq 7) is to be realised. The correlations include both cross-correlations from all the channels and the auto correlations. For economising on digital hardware it is important to understand the requirements herein for digitisation prior to correlation. If the requirement is only for a good image, without the information about the absolute levels of radiometric emission, only cross correlations in the summation correlation matrix are required, and the auto-correlations can be left out. As such, digitisation of the radiometric emission is sufficient using a single bit digitiser. This significantly simplifies the digital electronic architecture. Alternatively, if information about the absolute level of radiation temperature is required, say for the purposes of discrimination of objects, which have known levels of emission, the auto correlation information will be required to be included in the summation correlation matrix. In this case it is important to understand that the digital auto correlation necessarily requires the signal to be sampled with minimum of two bits, otherwise the correlation is always unity and information about the average level of emission would be lost. A single correlation matrix should be created at least every Nyquist sample time, which is the reciprocal of twice the radio frequency bandwidth, which is typically a few hundred pico-seconds. As such, signal direction from the electronic digitisation circuits are passed directly into the digital correlator. Correlation matrices are added together over an image frame time which is typically 40 ms, so giving 25 frames per second. Typically tens of millions of correlation matrices would need to be accumulated to create the summation correlation matrix.

The summation correlation matrix is then taken as the basis for the creation of a number of near field images. This can be a single image at a fixed range, or can be a plurality of images, each focused on a different range from the imager. The summation correlation matrix is phase shifted to synthesise the effect of placing a lens in front of the array, so as to create the equivalent of a near field visibility function. This phase shifted correlation matrix is then Fourier transformed to create a line of volume element pixels in front of the sensor. This constitutes a one dimensional near field image at a specific distance from the imager. Phase shifts corresponding to all desired near field ranges may be applied to the summation correlation matrix in turn, thus effectively focusing the array at different ranges. In the case of the 1D pupil plane array and 1D beam-former this will provide a 2D static image having axes of range and height (i.e. the axis of the 1D array), as illustrated in FIG. 2c. Movement of the apparatus, and subsequent combination of the resultant static images will provide 3D image information relating to the region under scrutiny. This 3D image information effectively comprises information on individual "voxels", or 3D pixels. In the case of the 2D pupil plane array and the 2D beam-former a 3D voxel image is created directly as a static image. In either case the sensor requires calibration and details of this are discussed below. The basic difference between the technique described here and that of radio astronomy is that here, in the near-field, it is not sufficient only to refer to the direction from which the emission originated, but necessary to refer also to the voxel of origin, in a 3D co-ordinate system before the imager.

The advantage of this method is that the phase corrections can be applied to the summation correlation matrix rather than at the radio frequency stage which would require a whole series of correlation matrices corresponding to each near-field range all running at the sampling frequency, typically hundreds of MHz to GHz. Doing the phase correction this way means there is a single summation correlation matrix and the phase shifts for multiple near-field ranges only need to be applied once per image frame, which will typically be every 40 ms, which requires less hardware and can be done easily in software.

The voxel information gained by the above processing may be further processed using standard image processing techniques to identify shapes of interest, such as knives, or other weapons or contraband. The 3D image may be analysed from multiple different projections, thus aiding threat identification.

The voxel image may be processed further to collapse the three dimensions into two dimensions, making it easier for an operator to interpret. As an operator is only interested in detecting objects and is not really concerned with voxels corresponding to empty space or transparent clothing, this voxel image may be processed to accentuate the former. The collapsing process involves selection of a particular voxel, in the axis being collapsed, where some information of interest is present, and repeating this process for all voxels in a region of interest. Regarding a 3D image to be collapsed as an array of data having axes X, Y and Z, the collapsing process will select, for each co-ordinate in the plane X, Y, a voxel at a Z co-ordinate thought to be of interest. Each selected Z voxel will form part of a 2D image having axes X and Y. Thus a complex 3D surface is effectively collapsed to a 2D image. This is illustrated in FIG. 9. An object to be viewed comprises a solid cylinder 37. If viewed from the left at pupil plane 38 the resultant image collapsed in the Z axis is as shown on display 39, by selecting the first pixel to contain useful image information. The hashed part of cylinder 37 is imaged as a rectangle 40. This differs from a view as would be seen by an ordinary camera in that all part of the rectangle 40 are in focus, whereas an ordinary camera would not be able to have the point of focus on the differing parts of the cylinder due to their differing ranges from the pupil plane 38. More than one voxel of interest for a given X, Y co-ordinate may be selected, and displayed in an appropriate manner, for example by using 3D perspective on a 2D computer screen. For example, as it is partially transparent, a dielectric sheet may provide image data from both of its sides, and so both sides may be presented in the resultant image. Shading may be used to illustrate the relative degree of absorption of such objects.

Viewing the cylinder 37 from a pupil plane 41 below the cylinder yields a circle 43 seen on display 42, collapsed in the X axis. This view is similar to that as would be viewed by a normal camera, as all distances from the pupil plane 41 to the imaged part of the cylinder 37 are the same.

In the case of a hand-held sensor this has a powerful utility as the operator does not need to be concerned with whether the subject is within the depth of field of the sensor; operation may be effected simply by placing the sensor close to the subject. Likewise for a portal system, all parts of a subject are likely to be in focus as the subject passed through it.

The resolution obtainable, i.e. the dimensions of the individual voxels, is related to the phase precision used in the digital beamformer. As an example, a phase precision of lambda/8, viewed at 35 GHz, will yield a voxel dimension of side 1 mm. This is indicated by the hashed lines 44. However, in practice, the actual spatial resolution likely to be achieved is between this figure and $\lambda/2$, due to the diffraction limits. In practice an optimum voxel size is chosen on a diminishing returns basis, as a compromise between the spatial resolution achieved and the processing power available to handle smaller sized voxels. Optimisation on processing power may be had by arranging those voxels corresponding to space where there is known to be no emission or scattering of radiation, to be larger. Information about which regions this may be could be determined adaptively from this apparatus or from another sensor.

The voxel image may be processed in such a way to highlight those plane sections which have the highest contrast, or those which are not considered to contain "empty space". This would be like in an auto focus camera that performs its focussing operation by choosing that focal length which maximises the contrast. However, unlike the visible camera, with this invention objects at several different ranges in different regions of near-field space can all be in focus at the same time. Effectively, this is like having a camera with a very large depth of field.

Image collapsing may also be done on static images, where the two dimensional plane image illustrated in FIG. 2c is collapsed into a one dimensional line pixel image. The one dimensional line image may then be mechanically scanned across the region, exploiting relative sensor-subject motion to yield a two dimensional image.

A further application utilising the ability to focus on different ranges simultaneously across a plane or volume lies in using optical systems to select a shape about which to collapse an axis of a multidimensional image. An optical system comprising a plurality of cameras may be used to image an object such as a person, and to use the images to determine key co-ordinates of the object. A multidimensional image recorded with an apparatus according to the present invention may then be collapsed around the object using the determined co-ordinates to provide a focus in the collapsed image that corresponds to the surface of the object. The collapsed image may be 1D or 2D, although 2D images will be more convenient for an operator to interpret.

In some sense the 3D voxel imaging is a more elaborated version of stereoscopy where the capability to locate objects in three dimensions may be used together with other sensors to offer a complementary capability, such as the combination with data from metal detectors or X-ray systems.

In this invention signals are necessarily digitised before the beamforming stage, which offers hitherto unrecognised powerful capabilities specifically for PMMW imaging, setting it aside from the classical field of radio astronomy where mainly analogue techniques have been used. See for example Thompson, A. R., Moran, J. M and Swenson, G. W. "*Interferometry and Synthesis in Radio Astronomy*", $2^{nd}$ Edition, Wiley, (2001)

In a PMMW imager, simultaneous wide fields of view (a used requirement) and large radio frequency bandwidths (to offer good radiometric sensitivity, cf. Eq. 1) are required. However increasing the bandwidth, $B_{RF}$, shortens the radiation coherence length $l_C$, as given by Eq. 6, where c is the speed of light. This limits the field of view over which correlation of the radiometric emission is guaranteed, thereby limiting the instrument field of view half angle, $\theta_{1/2}$, to that given by Eq. 7, where D is the aperture size. However, this apparently mutual exclusivity of bandwidth and field of view can be retrieved by digitally filtering signals from the receivers into a series of narrow band channels which each individually satisfy Eq. 7. This can be done much more compactly using digital technology than using bulky analogue filters. After the correlation process the different bandwidth signals can be reconstructed.

$$l_C = \frac{c}{B_{RF}} \qquad \text{Eq. 6}$$

$$\sin\theta_{1/2} < \frac{c}{DB_{RF}} \qquad \text{(Eq. 7)}$$

A further distinction between the prior art processing as employed in astronomy and this invention is that, where a heterodyne shift is used in the front end of the receiver, it introduces signal dispersion that needs to be removed before beam-forming can function effectively. Without this removal the imager will either a narrow field of view with a wide radio frequency bandwidth, or a wide field of view with a narrow radio frequency band. Again mutual exclusivity may be acceptable in radio astronomy, but would be entirely unacceptable in a PMMW imager. Using digital technology the heterodyne shift induced dispersion may be corrected by multiplying digital time histories of radiometric signals with phase shifts that are proportional to frequency. This is very difficult to do using analogue techniques over a broad frequency range. In the prior art of processing astronomical signals however analogue techniques are valid method to choose, due to the limited bandwidths being dealt with. The dispersion arises through the mixing process, as the fractional bandwidth changes during the downconversion. No analogue component has yet been found which can effectively remove the dispersion. However, a digital filter is ideally suited to this task as its dispersion characteristics can be fixed arbitrarily. A single multiply of a time sequence with the appropriate digital temporal response would suffice.

From the complexity of the science the benefit of digital technology for this application is not immediately obvious. As digital technology is generally more costly and bulky than analogue technology, for the same bandwidths, it is therefore an unusual step to take for the architecture of a PMMW imager, unless one understands these complex issues. Particularly in respect of large demands on bandwidth to achieve radiometric sensitivity, which requires large numbers of parallel data channels, all running at clock speeds of over 1 GHz, the benefits of a digital solution and its incumbent complexities are not at all obvious.

A distinction from the prior art of beam-forming radars operating in receive mode only is that the statistics of noise, receiver architectures and grating lobe generation are quite different. In phased array radar a coherent signal has to be sampled with a long word to achieve sufficient signal to noise ratio, whereas a electronic beam-forming passive millimeter wave imager can function using single bit sampling, as the signal to noise ratio before signal integration is unity, as stated above. Due to the nature of thermally generated radiation, its intensity on short radio frequency timescales ($\sim 1/B_{RF}$) varies greatly. This high level of fluctuation arises as photons are generated in a very random fashion, and there is no exclusion principle on photons to space out their wave functions in time and space. For this reason, only slightly better signal to noise ratios are achieved if large word sampling is employed. Since a passive millimeter wave imager is imaging essentially thermal noise from a scene and the radio frequency bandwidth is necessarily large, to achieve good signal to noise ratio in radiometry, the spectral gain in the receiver channels is necessarily much higher than in radar. Furthermore, since the architecture of the array layout is wide band in radiometry, the susceptibility of the array to surface modes from the regularity in the grating is much less, therefore different design constrains hold for the design of the electronic beam-forming PMMW imager.

Illumination systems, that increase the level of noise in the millimeter wave region, may be employed with the present invention where background emissions are insufficient for generating an image with acceptable contrast. One such illumination system is described in patent application WO2005/096103, the contents of which are included by reference.

Embodiments of the current invention may operate in real-time. This differentiates it from other systems that use correlation imaging such as the astronomical and earth observations systems mentioned above. All previous pupil plane passive imaging has been in non-real time. The real-time aspect sets it apart from the prior art as the density of receivers in the pupil plane necessarily has to be much greater, so the sensitivity, given by Eq. 1 can approach a few Kelvin or better. This brings in particular problems unique to this invention as the higher density of receivers introduces mutual coupling between the channels, which requires calibration. In the area of radio astronomy there is generally no mutual coupling between receivers as the distances between them is so great.

The summation correlation matrix requires further processing unknown in the area of radio astronomy to compensate for mutual interference between closely spaced receiver channels. In the field of earth observation a degree of coupling exists and attempt to calibrate this have been presented (see for example Tanner, A. B. and Swift, C. T. *"Calibration of a Synthetic Aperture Radiometer"*, IEEE Trans. on Geoscience and Remote Sensing, Vol 31, No. 1, Jan., (1993)), but the density of these arrays are still low in comparison to that for a system for real-time near field imaging. One method of calibrating an apparatus of the present invention is as follows. A coupling matrix is measured and the summation correlation matrix multiplied by this function to remove the mutual coupling effects. This coupling matrix can be measured by scanning a calibration point noise source through all voxels in the imager field of view and recording the summation correlation matrix for each point in the imager field of view. Using this method, simultaneous mutual coupling between channels, the phase and amplitude response of the individual receiver channels, and the near-field phase corrections can be calibrated. Mathematically the calibrated response in the near field given by Eq. 8, where $K_{i,j}$ is the correlation summation matrix and $c_{i,j}$ is the calibration matrix. The constraint that the voxel radiation temperature yielded by Eq. 8 is a real quantity, whilst in general the correlation summation matrix is in general complex, can be used to optimise the calibration matrix. In respect of Eq. 8 the creation of near-field radiation temperatures is quite different to that in the field of radio astronomy where Eq. 3 is solved.

$$T(x, y, z) = \sum_{k=1}^{n(n+1)/2} c_{i,j,z} K_{i,j} \qquad \text{Eq. 8}$$

Alternative calibration techniques may also be used. For example from the radar phased array domain appropriate for fully filled arrays an image of the pupil plane backscattered signal is processed by taking fast Fourier transforms of the sampled signal to yield the far-field image of the returned radar signal. Likewise it may be possible to apply similar processing for beam-forming radiometry, where care is taken to satisfy the radiometric requirements on the correlation lengths. This indeed would be more economical than using direction correlation technique for a fully filled array as the total number of mathematical operations is less. Alternative processing, such as using back-projection algorithms, using transforms closely related to the Fourier transform may also provide a more efficient method of processing, where only selected regions of an image are processed, thereby economising on the processing hardware. The mathematics from Darwood, P., Fletcher, P. N. and Hinton, G. S., *"Mutual coupling compensation in small planar array antennas"*, IEE Proc. Microw. Antennas Propag., Vol. 145, No. 1. February 1998, illustrates how mutual coupling in a closely space phased array radar receiver may be compensated for by using a Matrix approach, the success of the method is also illustrated in this reference.

Calibration procedures for this invention would follow the lines of a factory calibration following the above procedures, which may be repeated every six months to compensate for movements in receivers and long term changes in the phase and amplitude response of receivers, with regular calibration using auto-focussing methods. Auto-focusing would optimise increments in phase and amplitude in the calibration matrix whilst imaging known radiation sources in the near field.

FIG. 6 shows a fourth embodiment of the present invention, this time operative at infra-red wavelengths. Shown looking from below, a wand 24 has a plurality of sensors 25 positioned thereon spaced linearly along its length. Each sensor 25 comprises a small infra-red camera, mounted to the front of which is a lens. Each camera is adapted to generate an image from a localised area beneath it. The image information from each camera is combined by a processing means into a single image which may be displayed on a display system as shown in the other embodiments described herein (e.g. 19 of FIG. 7). Alternatively, pattern matching algorithms may be applied to the combined image information and an indication given if any detected patterns correlate with the expected shape of items of interest. Such an indication may take the form of a sound, a light, a vibration, or any other suitable means. The indication means may also comprise a display on which the image information is presented, which may also include augmentation to highlight detected shapes etc. This embodiment also incorporates a metal detector so as to improve the functionality to the apparatus. This provides the function of the prior art metal detecting wand, along with the improved imaging capabilities of the present invention. The processing means for integrating a static image from the infra-red sensors may be anything suitable.

FIG. 7 shows a simulation of an embodiment 27 of the invention being used in the security check of a person 26. In use, the apparatus 27 is positioned between 5 cm and 30 cm from the person 26 and waved around the body to take measurements from different parts. A display 28 is positioned on the rear of the apparatus and is visible to the user 29. The display 28 has a high aspect ratio, and covers a large proportion of the back of the apparatus 27. The display 28 is adapted to show substantially only the image information relating to the current position of the imager apparatus 27. Thus, the user will, at any instant, not see a complete picture of the region being examined. However, by moving the apparatus 27 around as is currently done with metal detecting wands the user will be able to gain a mental image of the regions not currently under the apparatus. In effect, movement of the apparatus 27 will create an evanescent image that is refreshed by movement. In the Figure, a bottle 30 hidden about the person 26 is shown partially imaged 31 by the imager 27. Movement of the imager 27 in a downwards direction will result in a different part of the bottle 30 being shown on the display 28.

The number of pixels in the display 28 will be dependent upon the resolution obtainable by the detection and processing parts of the apparatus. The higher the resolution capabilities, the greater the number of pixels which may usefully be used to display the image. The pixels may be arranged in a single row along the length of the apparatus. However, it is advantageous to use a plurality of rows, which allows a complex image comprising data from more than one static image to be displayed at the same time.

FIG. 8 shows an embodiment wherein the display 28 is made from two rows of pixels 34, 35, with a gap between them. This arrangement has been found to produce good results in terms of allowing an operator to discern the shape of objects detected by the apparatus, but also being cost effective. The imager 27 has two movement sensors 32, 33, positioned at each end of the display 28. Each movement sensor 32, 33 detects the movement of each end of the display 28. Using reading from the movement detectors 32, 33, a complex image can be built up on the two rows 34, 35 based upon the last static image to be measured, and upon previous ones, selected according to the measurements from the movement detectors. For example, if the movement of the imager 27 were a simple up-to-down movement, with the imager 27 being kept parallel to the floor, then one row 34 of pixels may comprise the latest static image, and the other row 35 may comprise a delayed version of the image displayed on row 34. The delay time would be dependent upon the speed of movement of the imager 27. If a more complex movement were made, such that one movement sensor 32 were moving faster than the other sensor 33, then the image on one or more of the rows may comprise of information from two or more previous static images.

The pixels coloured in black 36 represent a part of an object detected by the imager 27. As the imager 27 is moved, the viewer's brain will tend to add in the parts of the image that have just been scanned, in a process known as cognitive visual reconstruction. This effect results in the viewer seeing a more clear outline of detected objects. Of course, a secondary display (not shown) may also be used on the imager 27 that compiles a greater number of static images to produce a more detailed complex image covering most or all of the region scanned.

The image displayed on the display 28 or on a secondary display may be enhanced by the processing means to, for example, increase the contrast of the image, or to add false colours or edge detection to enable improved discrimination etc.

A metal detector may be used with any of the above embodiments. For example, the apparatus may incorporate a plurality of sensors each associated with a given part of it, each sensor being adapted to detect metallic objects near to its associated part of the apparatus. In this manner a localised metallic detection capability is achieved. The metal detector may be adapted to co-operate with the other sensor system, be it a mm wave sensor or an infra-red sensor system, whereby should the metal detector detect a metallic object near to a particular part of the wand, and the other sensor system also receive a strong signal from within that same part, then any display on the wand from the other sensor system (mm-wave or infra-red) may be enhanced to indicate that it is likely to be metallic. The enhancement may be by means of colour, brightness, or by any other suitable means.

The present invention is particularly suited to the detection of dielectric slab materials due to the digitisation of the electric fields associated with radiometric emissions thus capturing the phase and amplitude information. This enables digital filtering techniques to be used to extract information about the frequency structure in the radiometric emission. Where electric fields associated with the radiometric emissions are stored in digital format the frequency structure, which arises due to etalon effects in layered materials, and commonly referred to as Radiometric Cavity Fringes, may be measured. The basic phenomenon is that constructive and destructive interference of radiometric emission takes place when the layers of a dielectric material are thinner than the radiation coherence length (Eq. 6). Detection of Radiometric Cavity Fringes has been recognised as a method of detecting thin dielectric slab materials, more details of which are disclosed in patent application No. WO 2005/093463. The powerful use of digital filtering in the RF, IF or pre-detection phases of this invention, where phase information is still present, offers a powerful adaptive technique for identification of such structures in concealed objects. For example, digital filtering could be applied prior to formation of a series of summation correlation matrices, one for each frequency, then using post processor to examine the frequency structure within. This is a much more powerful and compact solution than relying on the bulky and fixed frequency analogue filters in the channels of existing PMMW imagers.

The invention may advantageously be used in a portal system. FIG. 10 shows a perspective view 45 and a plan view 46 of a portal incorporating six tiles e.g. 47 each of a type similar to that shown in FIG. 5. The tiles 47 are arranged to view an object passing through the portal, in this case a person 48 from a plurality of different sides. Although the tiles 47 are shown as being flat, in practice they may be curved, or take on any other convenient shape. A curved tile may make it more convenient to look around a subject, in order to provide different views of it. If significant curvature is introduced then synthesis of time delays by digital phase compensation or narrow band digital filter channelisation may be necessary to adjust wave-fronts to allow correlation and provide good imaging capability, as discussed above. Voxel information gathered by the tiles may be processed for viewing in any convenient manner. It may be collapsed into 2D images as described above, or it may be displayed in the form of a perspective image, which may conveniently be rotated as desired by an operator to show different views of the subject 48. A subject path 49 may be arranged that encourages the subject 48 to present various views of himself to the imagers, so maximising the chances of getting good views of the subject 48.

The skilled person will be aware that other embodiments within the scope of the invention may be envisaged, and thus the invention should not be limited to the embodiments as herein described.

The invention claimed is:

1. A passive detection apparatus comprising:
    a plurality of antenna elements arranged in an array, each antenna element receptive to radiation in the millimeter or sub-millimeter wavebands;
    a receiver system responsive to said elements, and further comprising a digital beamformer, a processor and an indicator, the receiver system adapted to receive and digitise radiometric emissions from a target, and the beamformer adapted to receive digital information from the receiver system and to pass information to the processor,
    wherein the beamformer is further adapted to process the received information to focus upon a near field region of the antenna array, the processor being interconnected to the beamformer and adapted to periodically generate static image information in at least a primary axis of the apparatus in real time or near-real time, and wherein the indicator is adapted to provide an indication based upon the generated static image information, wherein the beamformer is adapted to process the received information and focus at a plurality of ranges, each of said ranges is a different distance from the antenna, and to pass information relating to the plurality of ranges to the processor.

2. A detection apparatus as claimed in claim 1 wherein the digital beamformer utilises a correlation imaging algorithm adapted to process phase information to allow it to focus in the near field of the antenna array.

3. A detection apparatus as claimed in claim 1 wherein the antenna array comprises a one dimensional (1D) array in an axis x, and wherein the processor is adapted to produce two dimensional (2D) voxel information in an array (x,z) from the range information gathered for each antenna element.

4. A detection apparatus as claimed in claim 1 wherein the antenna array comprises a two dimensional (2D) array in axes x, y, and wherein the processor is adapted to produce three dimensional (3D) voxel information in an array (x, y, z) from the range information gathered for each antenna element.

5. A detection apparatus as claimed in claim 3 wherein the processor is adapted to process the array information such that, for each element of the array in the x axis, at least one range element is chosen corresponding to at least one voxel considered as having a significant contrast as compared to other range elements, and to produce an image based upon the selected range elements.

6. A detection apparatus as claimed in claim 4 wherein the processor is adapted to process the array information such that, for each element of the array in both the x and y axes, at least one range element is chosen corresponding to at least one voxel considered as having a significant contrast as compared to other range elements and to produce an image based upon the selected range elements.

7. A detection apparatus as claimed in claim 1 wherein the apparatus is adapted to be hand held.

8. A detection apparatus as claimed in claim 7 wherein the apparatus contains means for detecting relative movement between the apparatus and a subject being imaged.

9. A detection apparatus as claimed in claim 8 wherein the means for detecting movement is adapted to distinctly detect movement of two different parts of the apparatus.

10. A detection apparatus as claimed in claim 8 wherein image information is arranged to be generated in synchronisation with detected movement of the wand.

11. A detection apparatus as claimed in claim 1 wherein the indicator comprises a display adapted to display an image comprised primarily of image information from a region in the immediate vicinity of the apparatus.

12. A detection apparatus as claimed in claim 1 wherein the indicator comprises a display adapted to display an image comprised of complex image information formed from a plurality of static image.

13. A detection apparatus as claimed in claim 11, wherein the apparatus is adapted to be hand held and contains means for detecting relative movement between the apparatus and a subject being imaged, and further wherein the display comprises at least two rows of pixels, and wherein the display is adapted to show complex image information taken from a recently acquired static image and one or more older images, the image information to be displayed being determined using information from the means for detecting movement of the wand.

14. A detection apparatus as claimed in claim 1 wherein the apparatus further includes a metal detector.

15. A detection apparatus as claimed in claim 14 wherein the metal detector is adapted to associate a detected metallic object with a localised region of the apparatus.

16. A detection apparatus as claimed in claim 15 wherein the indicator comprises a display adapted to display an image comprised primarily of image information from a region in the immediate vicinity of the apparatus, and further wherein the apparatus is arranged to adapt image information associated with the localised region to indicate the possible presence of a metallic object.

17. A detection apparatus as claimed in claim 1 wherein a calibrator is incorporated that is adapted to measure an amplitude and phase response of individual receiver channels and mutual coupling between these channels and to use the measurements when beamforming.

18. A detection apparatus as claimed in claim 1 wherein an illuminator is employed to illuminate a scene being imaged, the illuminator adapted to have the characteristics of thermally generated radiometric noise.

19. A detection apparatus as claimed in claim 1 wherein the processor is adapted to filter the output of the beamformer to provide image information at a plurality of separate narrow bandwidths.

20. A detection apparatus as claimed in claim 1 wherein the apparatus is adapted to receive radiation of at least two distinct polarisations, and to digitise signals relating to each polarisation separately.

* * * * *